US009827535B2

(12) United States Patent
Okada et al.

(10) Patent No.: US 9,827,535 B2
(45) Date of Patent: Nov. 28, 2017

(54) STEAM PERMSELECTIVE MEMBRANE, AND METHOD USING SAME FOR SEPARATING STEAM FROM MIXED GAS

(75) Inventors: Osamu Okada, Kyoto (JP); Eiji Kamio, Kyoto (JP); Nobuaki Hanai, Kyoto (JP); Miwako Obama, Kyoto (JP)

(73) Assignee: Renaissance Energy Research Corporation, Kyoto (JP)

( * ) Notice: Subject to any disclaimer, the term of this patent is extended or adjusted under 35 U.S.C. 154(b) by 0 days.

(21) Appl. No.: 13/812,042

(22) PCT Filed: Jul. 26, 2011

(86) PCT No.: PCT/JP2011/066983
§ 371 (c)(1),
(2), (4) Date: Mar. 11, 2013

(87) PCT Pub. No.: WO2012/014900
PCT Pub. Date: Feb. 2, 2012

(65) Prior Publication Data
US 2013/0199370 A1    Aug. 8, 2013

(30) Foreign Application Priority Data
Jul. 26, 2010    (JP) .............................. P2010-167135

(51) Int. Cl.
*B01D 53/22*    (2006.01)
*B01D 53/26*    (2006.01)
(Continued)

(52) U.S. Cl.
CPC ........... *B01D 71/32* (2013.01); *B01D 53/228* (2013.01); *B01D 53/268* (2013.01);
(Continued)

(58) Field of Classification Search
CPC .. B01D 53/228; B01D 53/268; B01D 69/142; B01D 71/32; B01D 2256/22; B01D 2323/30; B01D 2325/36; B01D 2257/80
(Continued)

(56) References Cited

U.S. PATENT DOCUMENTS 4,666,668 A * 5/1987 Lidorenko et al. .... B01D 69/10
96/6
4,913,818 A * 4/1990 Van Wijk et al. ................ 95/52
(Continued)

FOREIGN PATENT DOCUMENTS

CA    2707425 A1    7/2009
CN    101711953 A    5/2010
(Continued)

OTHER PUBLICATIONS

International Search Report issued in corresponding International Application No. PCT/JP2011/066983 dated Oct. 11, 2011.
(Continued)

*Primary Examiner* — Jason M Greene
(74) *Attorney, Agent, or Firm* — Morgan, Lewis & Bockius LLP

(57) ABSTRACT

A steam permselective membrane containing a crosslinked hydrophilic polymer is provided. The steam permselective membrane may further contain at least one alkali metal compound selected from the group consisting of a cesium compound, a potassium compound and a rubidium compound.

15 Claims, 13 Drawing Sheets

(51) Int. Cl.
*B01D 71/32* (2006.01)
*B01D 69/14* (2006.01)

(52) U.S. Cl.
CPC ........ *B01D 69/142* (2013.01); *B01D 2256/22* (2013.01); *B01D 2257/80* (2013.01); *B01D 2323/30* (2013.01)

(58) Field of Classification Search
USPC ................... 95/45, 52; 96/4, 5, 11; 210/640
See application file for complete search history.

(56) References Cited

U.S. PATENT DOCUMENTS

| | | | |
|---|---|---|---|
| 5,171,449 A * | 12/1992 | Pasternak et al. | 95/52 |
| 5,445,669 A * | 8/1995 | Nakabayashi et al. | 96/10 |
| 5,749,941 A | 5/1998 | Jansen et al. | |
| 7,572,321 B2 * | 8/2009 | Yamakawa et al. | 96/11 |
| 7,622,045 B2 * | 11/2009 | Vane et al. | 95/52 |
| 7,985,279 B2 * | 7/2011 | Kondo et al. | 95/52 |
| 8,518,150 B2 * | 8/2013 | Spiegelman et al. | 95/52 |
| 2002/0104439 A1 | 8/2002 | Komkova et al. | |
| 2007/0051680 A1 * | 3/2007 | Vane et al. | 95/45 |
| 2010/0084335 A1 * | 4/2010 | Hubner et al. | 210/500.42 |
| 2011/0036237 A1 * | 2/2011 | Okada | B01D 69/10 95/51 |
| 2011/0107911 A1 | 5/2011 | Hoang et al. | |
| 2011/0143232 A1 * | 6/2011 | Burban | B01D 53/228 96/4 |
| 2012/0118816 A1 * | 5/2012 | Gjoka et al. | 210/506 |

FOREIGN PATENT DOCUMENTS

| | | | | |
|---|---|---|---|---|
| EP | 0308002 A1 | 3/1989 | | |
| EP | 2239048 A1 | 10/2010 | | |
| JP | H1-159025 A | 6/1989 | | |
| JP | H10-113531 A | 5/1998 | | |
| JP | 2004-050129 A | 2/2004 | | |
| JP | 2008-036463 A | 2/2008 | | |
| JP | 2008-036464 A | 2/2008 | | |
| JP | 2009-195900 A | 9/2009 | | |
| JP | 2010-005515 A | 1/2010 | | |
| JP | 2010-082619 A | 4/2010 | | |
| WO | 2009/093666 A1 | 7/2009 | | |
| WO | WO 2009/93666 | * | 7/2009 | ............ B01D 69/12 |
| WO | 2009/121124 A1 | 10/2009 | | |
| WO | WO 2009/121124 A1 * | 10/2009 | ............ B01D 67/00 |

OTHER PUBLICATIONS

Yegani et al., "Selective separation of CO2 by using novel facilitated transport membrane at elevated temperatures and pressures," Journal of Membrane Science, 291: 157-164 (2007).

Office Action issued in counterpart Chinese patent Application No. 201180036285.9 dated Jun. 5, 2014.

Extended European Search Report issued in counterpart European Patent Application No. 11812489.0 dated Jul. 4, 2014.

Office Action issued in counterpart Chinese Patent Application No. 201180036285.9 dated Apr. 3, 2015.

Xiuyuan et al., "Preparation of Polyvinyl Alcohol/Polyacrylic Acid Pervaporation Membrane Modified by Blending and Acetal Reaction," Journal of East China University of Science and Technology, 20: 735-739 (1994) (see English abstract).

Jansen et al., "Methods to improve flux during alcohol/water azeotrope separation by vapor permeation," Journal of Membrane Science, 68: 229-239 (1992).

Office Action issued in counterpart Japanese Patent Application No. P2012-526519 dated Feb. 2, 2016.

Notice of Allowance issued in counterpart Russian Patent Application No. 2013108261 dated Oct. 12, 2015.

Extended European Search Report issued in counterpart European Patent Application No. 15192073.3 dated Feb. 15, 2016.

Office Action issued in counterpart Canadian Patent Application No. 2804302 dated Mar. 30, 2017.

\* cited by examiner (a)

(b)

(a)

(b)

(a)

(b)

(a)

(b)

(a)

(b)

(a)

(b)

(a)

(b)

(a)

(b)

(a)

(b)

STEAM PERMSELECTIVE MEMBRANE, AND METHOD USING SAME FOR SEPARATING STEAM FROM MIXED GAS

TECHNICAL FIELD

The present invention relates to a steam permselective membrane, and a method for separating steam from a mixed gas using the membrane.

BACKGROUND ART

As a method for selectively separating steam from a mixed gas including steam, there has been suggested a method of using a separating membrane having a gel layer produced from an organic metal compound or an inorganic metal compound, as a steam permselective membrane (Patent Literature 1).

CITATION LIST

Patent Literature

Patent Literature 1: JP 2004-50129 A

SUMMARY OF INVENTION

Technical Problem

Conventional steam permselective membranes are not necessarily satisfactory in view of the permeation rate of steam, and of the selectivity to permeate steam selectively in the co-presence of other gases such as $CO_2$.

Thus, an object of the present invention is to provide a steam permselective membrane which is capable of permeating steam with a high permeation rate and high selectivity.

Solution to Problem

The steam permselective membrane according to the present invention contains a crosslinked hydrophilic polymer. This steam permselective membrane preferably further contains an alkali metal compound. Alternatively, the steam permselective membrane according to the present invention may contain a hydrophilic polymer and an alkali metal compound.

When the steam permselective membrane according to the present invention is used, steam permeation is enabled with a high permeation rate and high selectivity.

From the viewpoint of enhancing the permeation rate and the selectivity of steam, the alkali metal compound may include at least one kind of alkali metal compound selected from the group consisting of a cesium compound, a potassium compound, and a rubidium compound. When the alkali metal compound includes a cesium compound, the concentration of cesium based on the total mass of the hydrophilic polymer and the alkali metal compound may be 0.003 mol/g or less. When the alkali metal compound includes a potassium compound and/or a rubidium compound, the total concentration of potassium and rubidium based on the total mass of the hydrophilic polymer and the alkali metal compound may be 0.005 mol/g or less.

According to another aspect, the present invention relates to a method for separating steam from a mixed gas. The method according to the present invention includes separating steam from a mixed gas by causing steam in the mixed gas containing steam to permeate through the steam permselective membrane according to the present invention. For example, it is preferable to cause steam to permeate through the steam permselective membrane by supplying a mixed gas containing steam to one surface side of the steam permselective membrane, and reducing the partial pressure of steam on the other surface side of the steam permselective membrane to less than the partial pressure of steam in the mixed gas. In this case, the partial pressure of steam on the other surface side of the steam permselective membrane may be reduced to less than the partial pressure of steam in the mixed gas without substantially using a sweep gas.

According to the method related to the present invention, steam may be separated from a mixed gas containing steam with a high permeation rate and high selectivity.

Since the steam permselective membrane according to the present invention enables permeation of steam with high selectivity to $CO_2$, the method according to the present invention is particularly useful in the case of separating steam from a mixed gas containing steam and $CO_2$ gas.

Advantageous Effects of Invention

When the steam permselective membrane according to the present invention is used, steam permeation is enabled with a high permeation rate and high selectivity. The steam permselective membrane of the present invention can exhibit a high permeation rate and high selectivity even at a high temperature exceeding 100° C. Further, the steam permselective membrane according to the present invention is an organic membrane, and as compared with inorganic membranes, the steam permselective membrane is advantageous in that molding processing is easy, and the cost per unit membrane area is low.

DESCRIPTION OF EMBODIMENTS

Hereinafter, suitable exemplary embodiments of the present invention will be described in detail. However, the present invention is not intended to be limited to the following exemplary embodiments.

Figure 1:
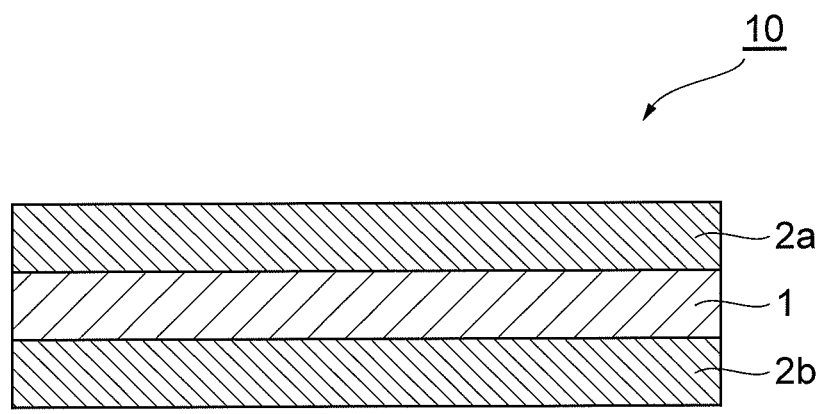
FIG. 1 is a cross-sectional diagram showing an exemplary embodiment of a membrane laminate including a steam permselective membrane.

FIG. 1 is a cross-sectional diagram showing an exemplary embodiment of a membrane laminate including a steam permselective membrane. The membrane laminate 10 illustrated in FIG. 1 is composed of a steam permselective membrane 1, and porous membranes 2a and 2b that are provided on both sides of the steam permselective membrane 1.

The steam permselective membrane 1 has a gel-like hydrophilic polymer layer containing a crosslinked hydrophilic polymer. The hydrophilic polymer layer is a hydrogel in which hydrophilic polymer is crosslinked and forms a three-dimensional network structure. A hydrogel often has a property of swelling by absorbing water. The hydrophilic polymer is selected from, for example, a polyvinyl alcohol-polyacrylic acid salt copolymer (PVA-PAA salt copolymer), polyvinyl alcohol, polyacrylic acid, chitosan, polyvinylamine, polyallylamine, and polyvinylpyrrolidone. The degree of crosslinking of the hydrogel of a PVA-PAA salt copolymer and the degree of crosslinking of the hydrogel of polyvinyl alcohol may be further adjusted by a dialdehyde compound such as glutaraldehyde, and/or an aldehyde compound such as formaldehyde. A PVA-PAA salt copolymer is also known as a PVA-PAA copolymer to those ordinarily skilled in the art.

The hydrophilic polymer layer preferably contains at least one kind of alkali metal compound selected from the group consisting of a cesium compound, a potassium compound and a rubidium compound. This alkali metal compound functions as a carrier that promotes selective permeation of moisture. The alkali metal compound is, for example, a hydroxide, a carbonate, a nitrate, a carboxylate (acetate or the like), or a chloride of an alkali metal selected from cesium (Cs), potassium (K) and rubidium (Rb). The hydrophilic polymer layer may further contain a lithium compound and/or a sodium compound, in addition to the alkali metal compound selected from a cesium compound, a potassium compound and a rubidium compound.

When the alkali metal compound includes a cesium compound, the concentration of cesium based on the total mass of the hydrophilic polymer and the alkali metal compound is preferably 0.003 mol/g or less. When the alkali metal compound includes a potassium compound and/or a rubidium compound, the total concentration of potassium and rubidium based on the total mass of the hydrophilic polymer and the alkali metal compound is preferably 0.005 mol/g or less. When the concentrations of the alkali metals in the steam permselective membrane are in these value ranges, permeation of steam is enabled with higher selectivity to $CO_2$. However, in the calculation of these concentrations, the mass of the lithium compound and the sodium compound is not included in the total mass of the alkali metal compound.

There are no particular limitations on the lower limit of the concentration of the at least one kind of alkali metal selected from the group consisting of a cesium compound, a potassium compound and a rubidium compound, but the lower limit is preferably 0.001 mol/g or higher based on the total mass of the hydrophilic polymer and the alkali metal compound.

The steam permselective membrane 1 may have a hydrophilic polymer layer containing an uncrosslinked hydrophilic polymer and at least one kind of alkali metal compound selected from the group consisting of a cesium compound, a potassium compound and a rubidium compound. The hydrophilic polymer used in this case is selected from, for example, polyvinyl alcohol, polyacrylic acid, chitosan, polyvinylamine, polyallylamine, and polyvinylpyrrolidone. Regarding the alkali metal compound, those described above may be used. The preferred concentration range of the alkali metal is also the same as described above.

It is preferable that the steam permselective membrane 1 be composed of the hydrophilic polymer layer and a porous membrane, and at least a portion of the hydrophilic polymer layer is filled into the porous membrane. This porous membrane is preferably hydrophilic. Examples of a hydrophilic porous membrane include a hydrophilized polytetrafluoroethylene porous membrane (hydrophilic PTFE porous membrane), and a hydrophilic ceramic porous membrane (alumina porous membrane, or the like).

The porous membranes 2a and 2b are preferably hydrophobic. Examples of a hydrophobic porous membrane include a polytetrafluoroethylene porous membrane that is not hydrophilized (hydrophobic PTFE porous membrane). The porous membranes 2a and 2b may not necessarily be provided.

The membrane laminate 10 may be produced by, for example, a method which comprises a step of preparing a cast solution containing a hydrophilic polymer, together with optionally an alkali metal compound, and water that dissolves these components; a step of forming a film of the cast solution on one of the porous membranes, porous membrane 2a; a step of drying the film of the cast solution to form a hydrophilic polymer layer; and a step of providing the other one of the porous membranes, porous membrane 2b, on the hydrophilic polymer layer.

The cast solution may be prepared by dissolving a hydrophilic polymer and an alkali metal compound in water. The hydrophilic polymer may be chemically crosslinked by adding a crosslinking agent such as glutaraldehyde to the cast solution. In order to carry out crosslinking of the hydrophilic polymer, the cast solution is heated as necessary.

A film of the cast solution may be formed by casting the casting solution. Casting may be carried out by a conventional method of using an applicator or the like. When a hydrophilic porous membrane is placed on a hydrophobic porous membrane 2a, and the cast solution is cast on the hydrophilic porous membrane, a portion of the cast solution is filled into the hydrophilic porous membrane.

By removing water from the film of the cast solution, a gel-like hydrophilic polymer layer is formed. Thereafter, the hydrophilic polymer may be further crosslinked by heating.

A porous membrane 2b is laminated on the steam permselective membrane 1 having a hydrophilic polymer layer, and thus a membrane laminate 10 is obtained.

The membrane laminate according to the present exemplary embodiment may be used to separate steam from a mixed gas containing steam and other gases. A mixed gas containing steam is supplied to the side of the porous membrane 2a (feed side), steam is caused to permeate through the steam permselective membrane 1, and thereby the permeated steam is separated into the side of the porous membrane 2b. Steam may be permeated efficiently through the steam permselective membrane 1 by reducing the partial pressure of steam on the opposite side of the porous membrane 2a of the membrane laminate 10, to be lower than the partial pressure of steam in the mixed gas that is supplied to the side of the porous membrane 2a. A sweep gas such as Ar gas may be continuously supplied to the side of the porous membrane 2b. However, for example, in the case of reutilizing steam that is recovered from the mixed gas, it is preferable to adjust the partial pressure difference of steam without substantially using a sweep gas. When a sweep gas is not used, high purity steam may be particularly easily reutilized. The partial pressure difference of steam may be adjusted by a method of setting the total pressure on the side of the porous membrane 2a to be higher than the total pressure on the side of the porous membrane 2b, or the like. The steam permselective membrane 1 may also be used for applications other than reutilization of steam, such as dehumidification of a mixed gas.

On the occasion of permeating steam, the steam permselective membrane 1 is preferably heated to 100° C. to 200° C. The steam permselective membrane according to the present exemplary embodiment may exhibit high steam permeability and high steam selectivity even at such a high temperature. Therefore, it is possible to recover and reutilize steam at a high temperature, without liquefying the steam by cooling. According to this method, latent heat of steam may be effectively utilized, as compared with the case of heating again the water that has been liquefied by cooling, and reutilizing the water as steam, and therefore, higher energy efficiency may be realized. Meanwhile, when the steam that has permeated through the steam permselective membrane is not reutilized as steam, or in similar cases, the recovered steam may be recovered by liquefying the steam by cooling.

The steam permselective membrane 1 according to the present exemplary embodiment is used particularly suitably to separate steam from a mixed gas containing steam and $CO_2$. For example, allowing $CO_2$ gas in a raw material gas containing $CO_2$ gas to permeate through a $CO_2$ permselective membrane, and thereby recovering the permeated $CO_2$ gas together with steam as a sweep gas; allowing steam in a mixed gas containing steam and $CO_2$ gas to permeate through a steam permselective membrane, and thereby separating steam from the mixed gas; and reutilizing the separated steam as a sweep gas, may be combined. By using a method employing such a combination, $CO_2$ may be recovered from a gas containing $CO_2$ with high energy efficiency.

The steam permselective membrane is not intended to be limited to the exemplary embodiment described above, and as long as the gist of the present invention is maintained, appropriate modification may be made. For example, the steam permselective membrane may be formed into a cylindrical shape.

Figure 2:
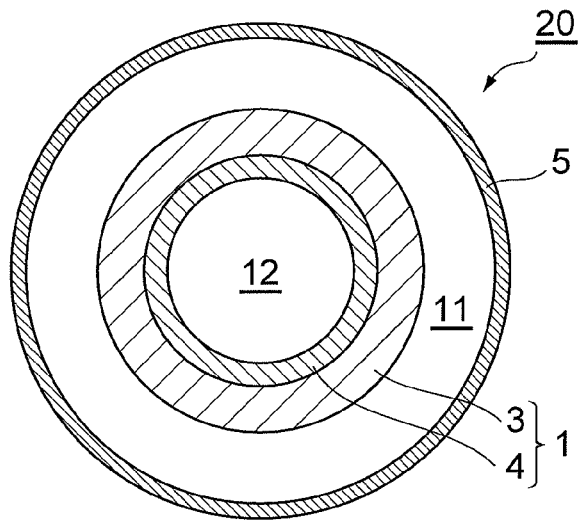
FIG. 2 is a cross-sectional diagram showing an exemplary embodiment of a gas treating apparatus including a steam permselective membrane.
Figure 2:
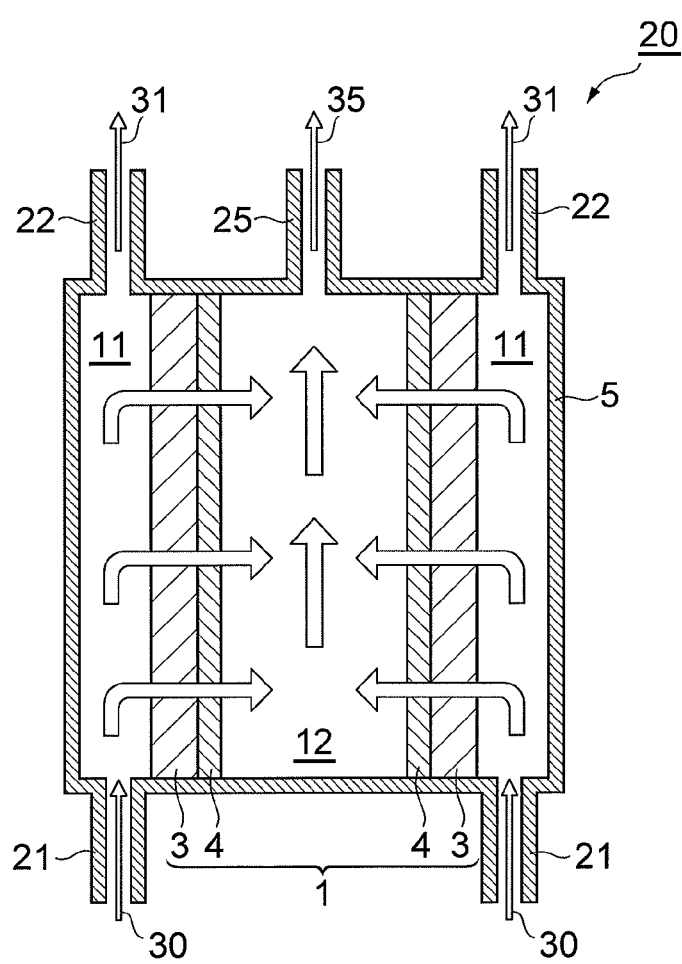

FIG. 2 is a cross-sectional diagram showing an exemplary embodiment of a gas treating apparatus including a cylindrical-shaped steam permselective membrane. FIG. 2(a) illustrates a cross-section that is perpendicular to the longitudinal direction of the gas treating apparatus, and FIG. 2(b) illustrates a cross-section that is parallel to the longitudinal direction of the gas treating apparatus. The gas treating apparatus 20 illustrated in FIG. 2 includes a cylindrical-shaped steam permselective membrane 1, and a cylindrical-shaped container 5 that accommodates the steam permselective membrane 1. The steam permselective membrane 1 is composed of a cylindrical-shaped hydrophilic polymer layer 3 and a cylindrical-shaped porous membrane 4 provided inside the cylindrical-shaped polymer layer. A portion of the hydrophilic polymer layer 3 is filled into the porous membrane 4. The hydrophilic polymer layer 3 and the porous membrane 4 in FIG. 2 may be respectively formed from the same materials as those of the hydrophilic polymer layer and the porous membrane that constitute the steam permselective membrane 1 of FIG. 1. The hydrophilic polymer layer 3 may be supported on the inner peripheral surface side of the porous membrane 4. The cross-sectional shape of the cylindrical-shaped steam permselective membrane is not necessarily perfect circle, and modification into any arbitrary shape such as an elliptical shape may be made.

In regard to the container 5 and the steam permselective membrane 1, the steam permselective membrane 1 divides the interior of the container 5, and thereby a feed-side space 11 into which a mixed gas 30 containing steam flows, and a sweep-side space 12 containing a discharge gas 35 containing steam that has permeated through the steam permselective membrane 1 are formed. The container 5 has an opening 21 provided at one end, which makes the feed-side space 11 open into the outside of the container 5, and provided at the other end, an opening 21 which makes the feed-side space 11 open into the outside of the container 5 and an opening 25 which makes the seep-side space 12 open into the outside of the container 5. The mixed gas 30 is supplied to the feed-side space 11 through the opening 21, and is discharged through the opening 22. The steam that has been separated from the mixed gas 30 by permeating through the steam permselective membrane 1, is collected into the discharge gas 35 that is discharged through the opening 25. It is also acceptable to allow a steam gas to flow into the sweep-side space 12 as described above.

Examples

Hereinafter, the present invention will be more specifically described by way of Examples. However, the present invention is not intended to be limited to these Examples.

(Study 1)
1. Production of Membrane Laminates Including Steam Permselective Membrane
(1) PVA-PAA Salt Copolymer 2.0 g of a PVA-PAA salt copolymer (manufactured by Sumitomo Seika Chemicals Co., Ltd.; hereinafter, referred to as "SS gel") was dissolved in 80.0 g of ion-exchanged water at room temperature. 0.064 g of a 25% by mass aqueous solution of glutaraldehyde was added to the SS gel solution thus obtained. Subsequently, the solution was heated at 95° C. for 12 hours to carry out chemical cross-linking by glutaraldehyde, and thus a cast solution was obtained.

A hydrophobic PTFE porous membrane (manufactured by Sumitomo Electric Industries, Ltd., Fluoropore FP-010) was mounted on a glass plate, and a hydrophilic PTFE porous membrane (manufactured by Sumitomo Electric Industries, Ltd., WPW-020-80) was mounted thereon. The cast solution was cast on the hydrophilic PTFE porous membrane to a thickness of 500 μm by using a baker applicator. At this time, a portion of the cast solution was filled into the hydrophilic PTFE porous membrane. Thereafter, the cast solution thus cast was dried for about 12 hours in a dry box that was maintained at a humidity of about 5%, and thereby a gel layer was formed. After drying, the gel layer thus formed was placed, together with the glass plate, in a constant temperature chamber that was maintained at 120° C., and thermal crosslinking was carried out for 2 hours. Thus, a steam permselective membrane composed of a hydrophilic PTFE porous membrane and a gel layer was formed. Furthermore, a hydrophobic PTFE porous membrane was laminated on the steam permselective membrane, and thus a membrane laminate having a three-layer configuration of hydrophobic PTFE porous membrane/steam permselective membrane/hydrophobic PTFE porous membrane was obtained.

(2) PVA-PAA Salt Copolymer/CsOH 2.0 g of a PVA-PAA salt copolymer (SS gel) was dissolved in 80.0 g of ion-exchanged water at room temperature. 0.064 g of a 25% by mass aqueous solution of glutaraldehyde was added to the aqueous SS gel solution thus obtained. Subsequently, the solution was heated at 95° C. for 12 hours to thereby carry out chemical crosslinking by glutaraldehyde. Thereafter, CsOH was added to the solution as a carrier, CsOH was dissolved therein, and thus a cast solution was obtained. The amount of CsOH was adjusted such that the concentration of CsOH relative to the total mass of the SS gel and CsOH would be 30% by mass. At this time, the molar concentration of Cs was 0.002 mol/g based on the total mass of the SS gel and CsOH.

A hydrophobic PTFE porous membrane (manufactured by Sumitomo Electric Industries, Ltd.; Fluoropore FP-010) was mounted on a glass plate, and a hydrophilic PTFE porous membrane (manufactured by Sumitomo Electric Industries, Ltd.; WPW-020-80) was mounted thereon. The cast solution was cast on the hydrophilic PTFE porous membrane to a thickness of 500 μm by using a baker applicator. Thereafter, the cast solution thus cast was dried for about 12 hours in a dry box that was maintained at a humidity of about 5%, and thereby a gel layer was formed. After drying, the gel layer thus formed was placed, together with the glass plate, in a constant temperature chamber that was maintained at 120° C., and thermal crosslinking was carried out for 2 hours. Thus, a steam permselective membrane composed of a hydrophilic PTFE porous membrane and a gel layer was formed. Furthermore, a hydrophobic PTFE porous membrane was laminated on the steam permselective membrane, and thus a membrane laminate having a three-layer configuration of hydrophobic PTFE porous membrane/steam permselective membrane/hydrophobic PTFE porous membrane was obtained.

(3) PVA/CsOH

In 10.25 g of a 5% by mass aqueous PVA solution, 0.219 g of CsOH as a carrier was dissolved, and thus a cast solution was obtained. At this time, the molar concentration of Cs was 0.002 mol/g based on the total mass of PVA and CsOH.

A hydrophobic PTFE porous membrane (manufactured by Sumitomo Electric Industries, Ltd.; Fluoropore FP-010) was mounted on a glass plate, and a hydrophilic PTFE porous membrane (manufactured by Sumitomo Electric Industries, Ltd.; WPW-020-80) was mounted thereon. The cast solution was cast on the hydrophilic PTFE porous membrane to a thickness of 500 μm by using a baker applicator. Thereafter, the cast solution thus cast was dried for about 12 hours in a dry box that was maintained at a humidity of about 5%, and thereby a steam permselective membrane composed of a hydrophilic PTFE porous membrane and a PVA layer was formed. Furthermore, a hydrophobic PTFE porous membrane was laminated on the steam permselective membrane, and thus a membrane laminate having a three-layer configuration of hydrophobic PTFE porous membrane/steam permselective membrane/hydrophobic PTFE porous membrane was obtained.

(4) PVA (Membrane for Comparison)

A hydrophobic PTFE porous membrane (manufactured by Sumitomo Electric Industries, Ltd.; Fluoropore FP-010) was mounted on a glass plate, and a hydrophilic PTFE porous membrane (manufactured by Sumitomo Electric Industries, Ltd.; WPW-020-80) was mounted thereon. A 5% by mass aqueous PVA solution was cast on the hydrophilic PTFE porous membrane to a thickness of 500 μm by using a baker applicator. Thereafter, the aqueous PVA solution thus cast was dried for about 12 hours in a dry box that was maintained at a humidity of about 5%, and thereby, a steam permselective membrane composed of a hydrophilic PTFE porous membrane and a PVA layer was formed. Furthermore, a hydrophobic PTFE porous membrane was laminated on the steam permselective membrane, and thus a membrane laminate having a three-layer configuration of hydrophobic PTFE porous membrane/steam permselective membrane/ hydrophobic PTFE porous membrane was obtained.

2. Evaluation of Gas Permeation Performance

A membrane laminate was mounted on a membrane evaluation apparatus, and an evaluation of gas permeation performance was carried out. While the membrane laminate was heated to a predetermined temperature, a raw material gas containing $CO_2$, $N_2$ and $H_2O$ (steam) was supplied to one of the surface sides (feed side) of the membrane laminate, and Ar gas as a sweep gas was caused to flow to the opposite side of the feed side (sweep side). Water was recovered from a discharge gas including the gas that had permeated from the feed side to the sweep side and the Ar gas, by using a cooling trap, and the amount of recovered water was quantitatively determined at a constant time interval. The steam permeance [mol/(m²·s·kPa)] of the membrane, which is an index of the steam permeation rate, was calculated based on the amounts thus determined. The composition of the remaining discharge gas was quantitatively determined by gas chromatography, and from these results and the flow rate of Ar gas, the $CO_2$ permeance [mol/(m²·s·kPa)] of the membrane was calculated. Furthermore, the ratio of the steam permeance to the $CO_2$ permeance (steam permeance/$CO_2$ permeance) was calculated as the selectivity of steam permeation to $CO_2$ permeation (steam/$CO_2$ selectivity). The evaluation conditions of the gas permeation performance are presented in the following table.

TABLE 1

|  |  | Reference value | Unit |
| --- | --- | --- | --- |
| Temperature |  | 110, 115, 120, 125, 130 | ° C. |
| Pressure | Feed | 200 | kPa |
|  | Sweep | 180 | kPa |
| Pressure difference |  | 20 | kPa |
| Gas flow rate(dry base) |  |  |  |
| Feed | $CO_2$ | 16 | mL/min |
|  | $N_2$ | 144 | mL/min |
| Sweep | Ar | 40 | mL/min |
| Amount of $H_2O$ supply | Feed* | 0.117 | mL/min |
|  | Sweep | — | mL/min |

*The steam fraction on the feed side was 50%.

Figure 3:
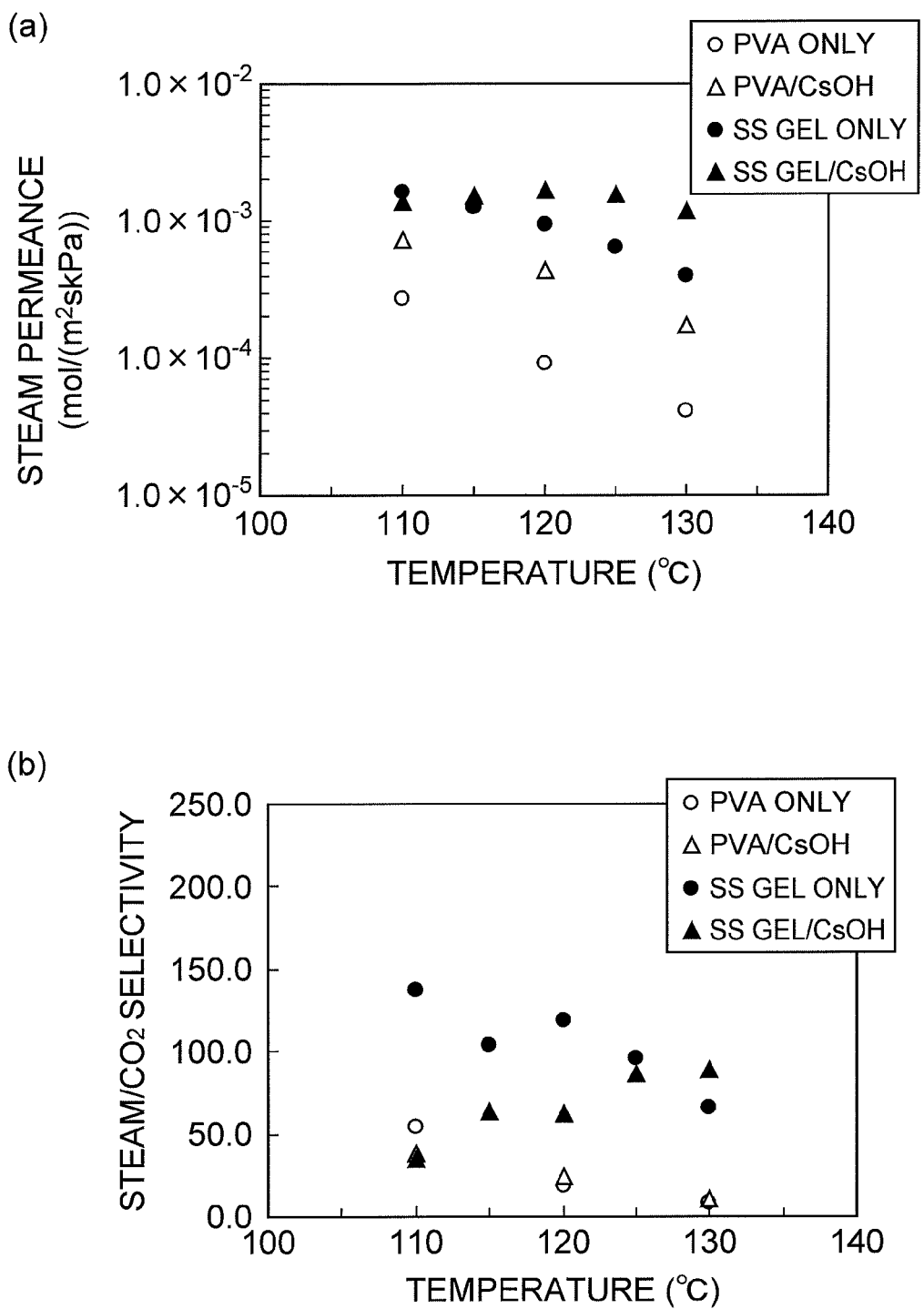
FIG. 3 is a graph showing the relation between the steam permeance and temperature, and the relation between the steam/$CO_2$ selectivity and temperature.
Figure 4:
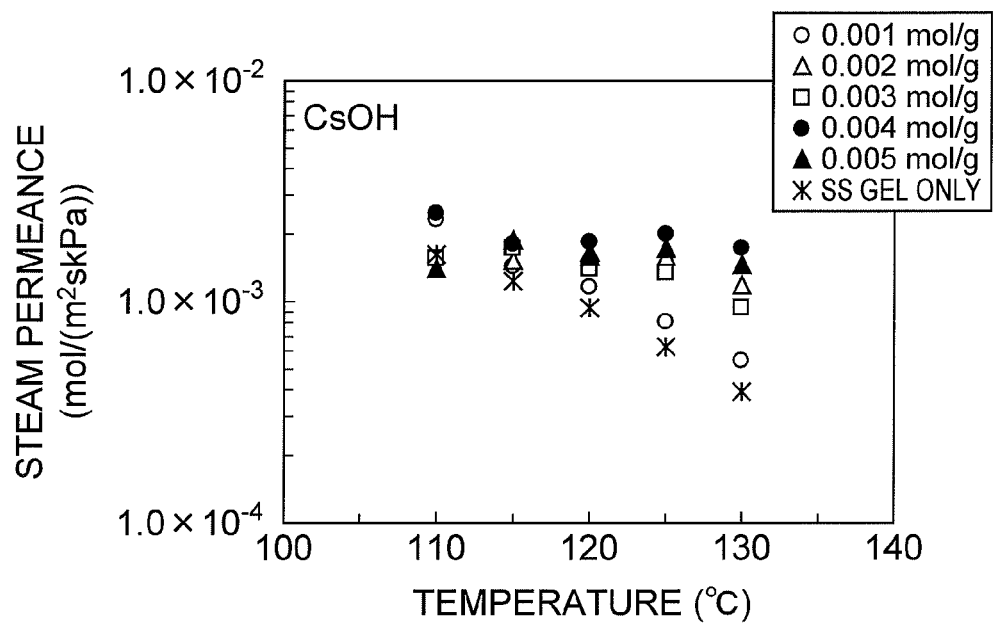
FIG. 4 is a graph showing the relation between the steam permeance and temperature, and the relation between the steam/$CO_2$ selectivity and the Cs concentration.
Figure 4:
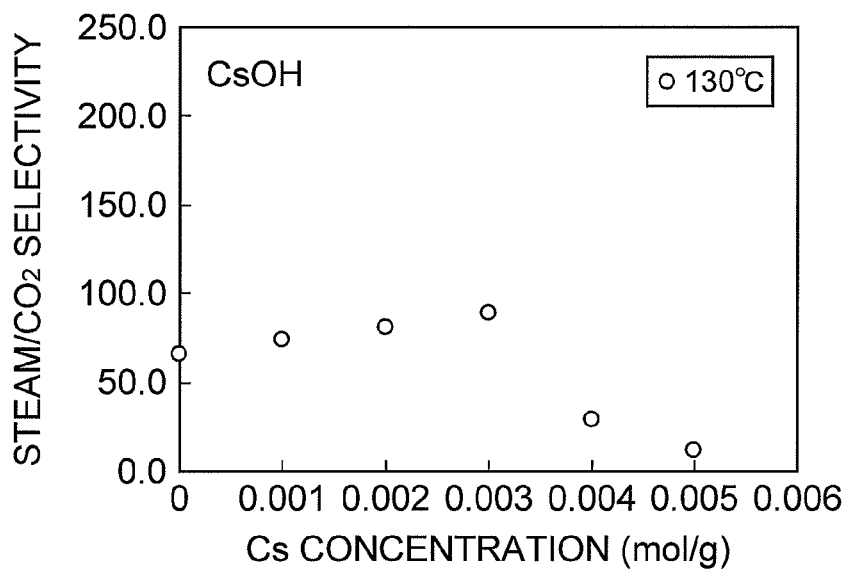
Figure 5:
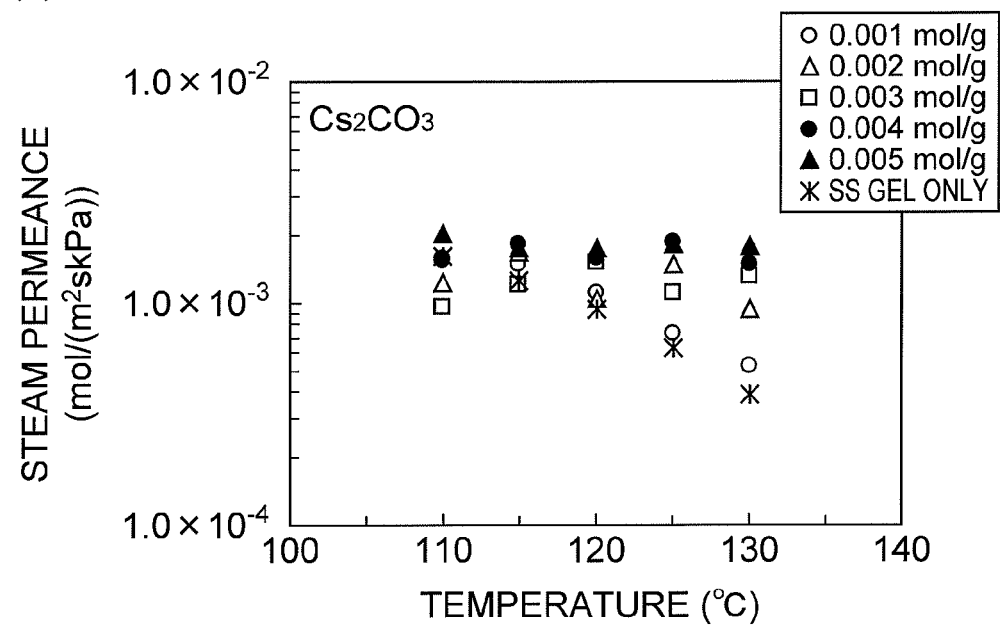
FIG. 5 is a graph showing the relation between the steam permeance and temperature, and the relation between the steam/$CO_2$ selectivity and the Cs concentration.
Figure 5:
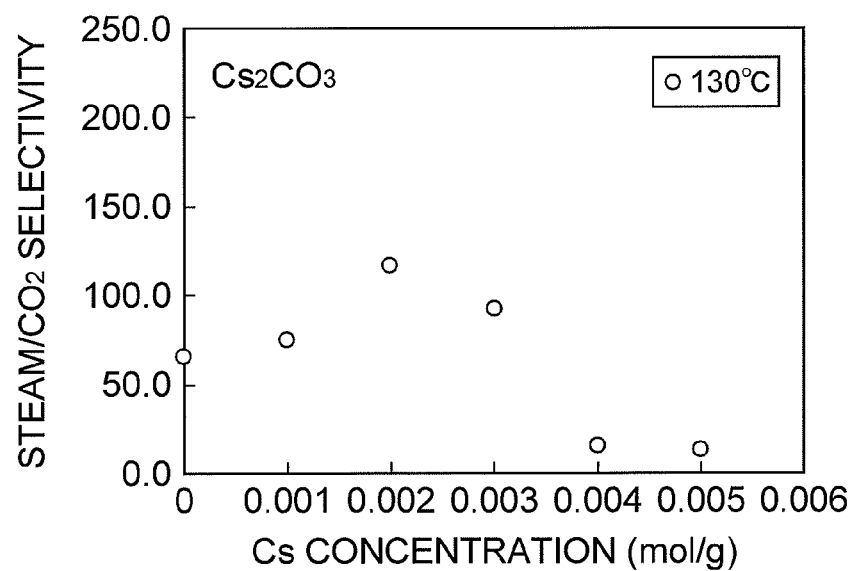
Figure 6:
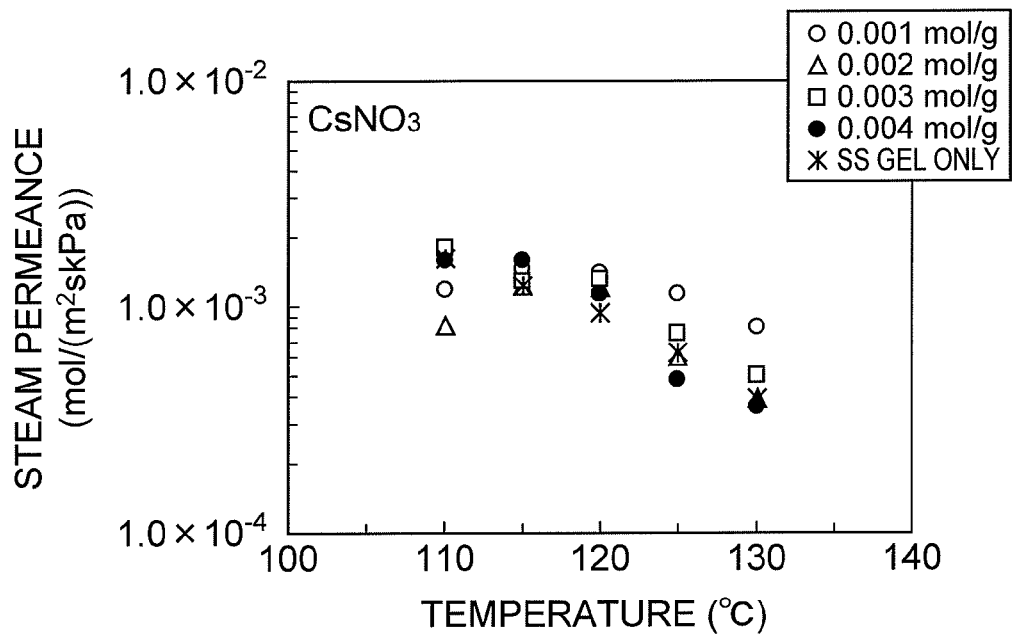
FIG. 6 is a graph showing the relation between the steam permeance and temperature, and the relation between the steam/$CO_2$ selectivity and the Cs concentration.
Figure 6:
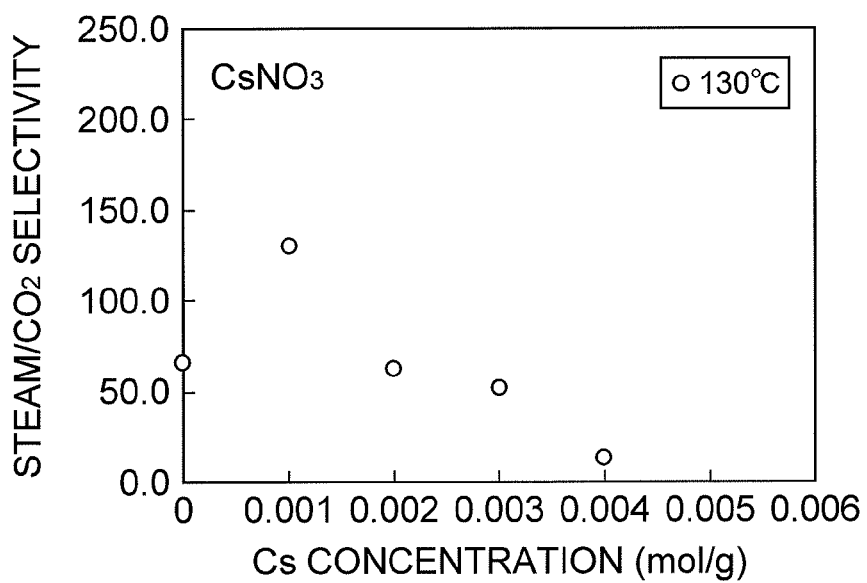
Figure 7:
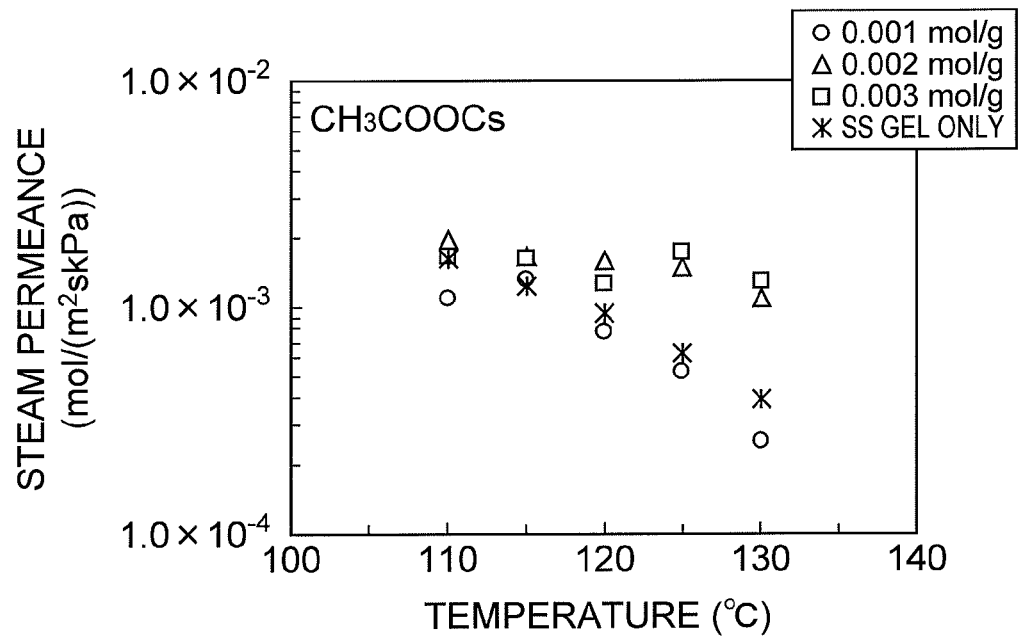
FIG. 7 is a graph showing the relation between the steam permeance and temperature, and the relation between the steam/$CO_2$ selectivity and the Cs concentration.
Figure 7:
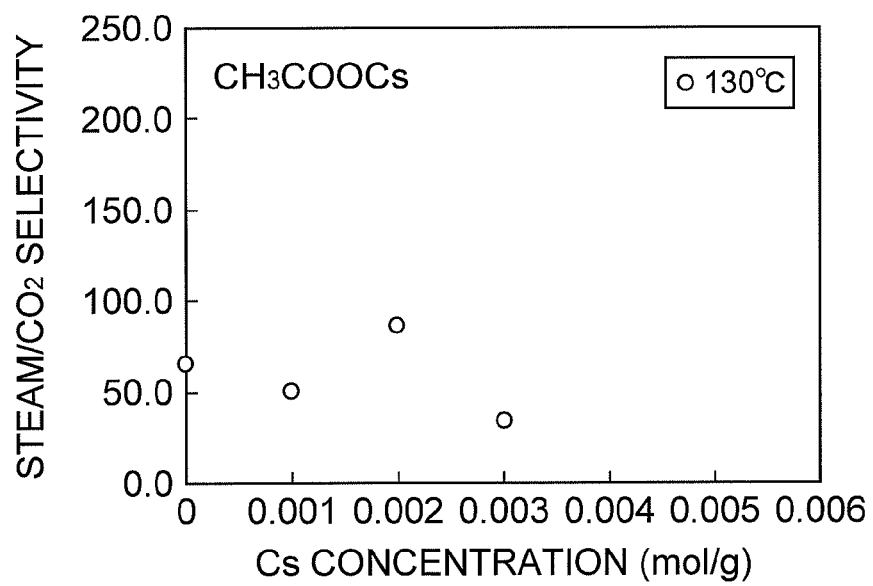
Figure 8:
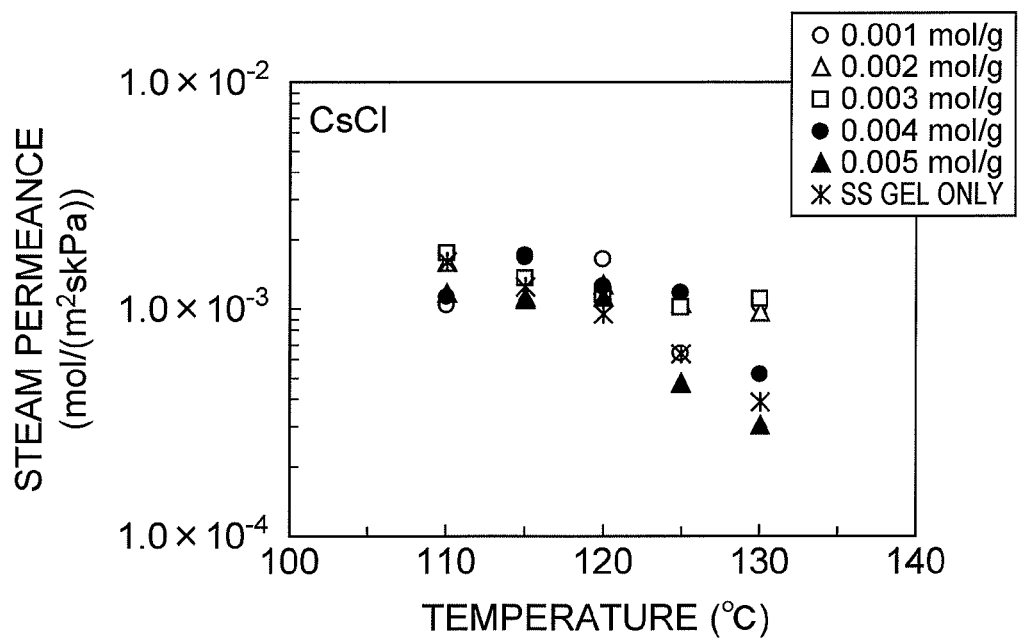
FIG. 8 is a graph showing the relation between the steam permeance and temperature, and the relation between the steam/$CO_2$ selectivity and the Cs concentration.
Figure 8:
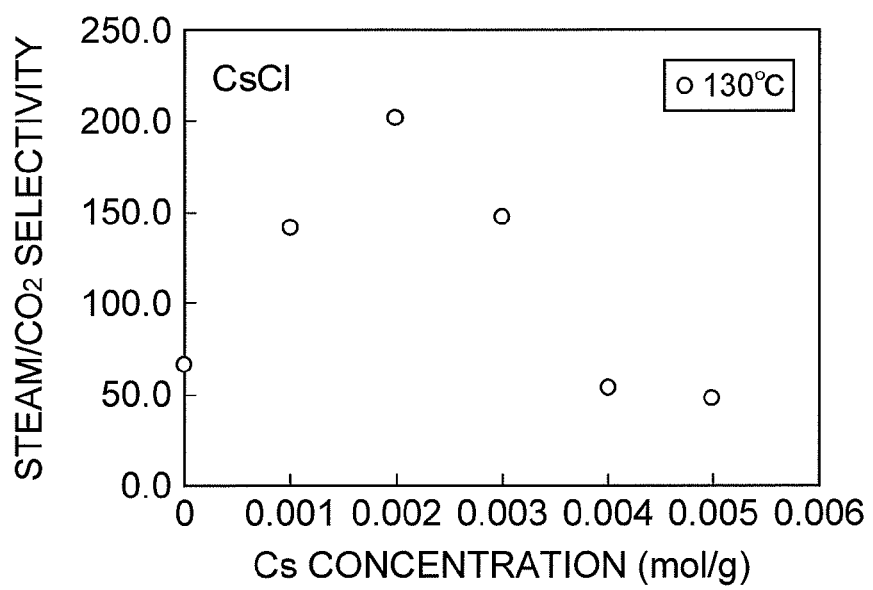
Figure 9:
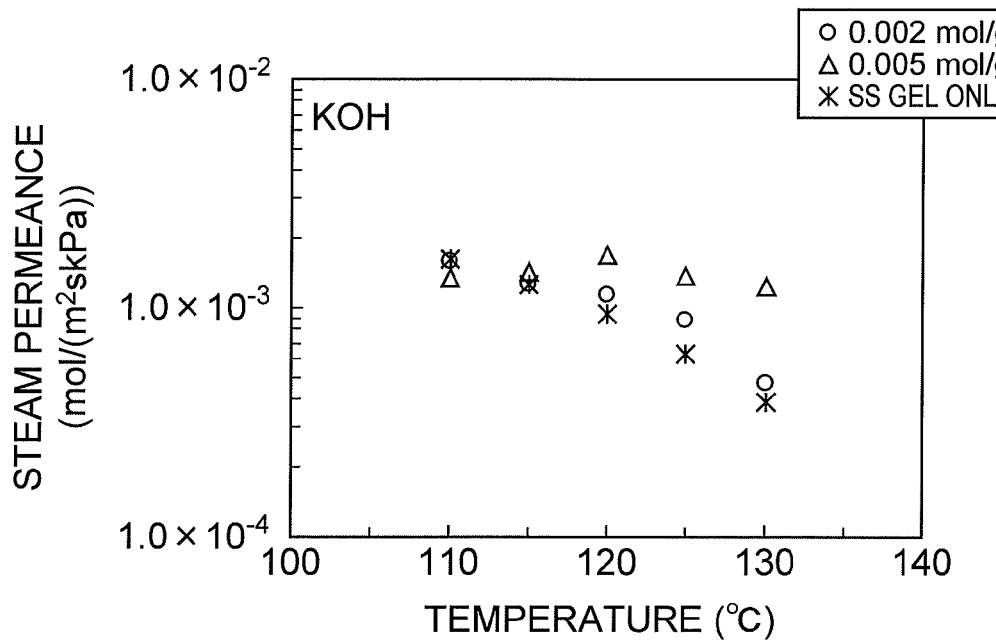
FIG. 9 is a graph showing the relation between the steam permeance and temperature, and the relation between the steam/$CO_2$ selectivity and the K concentration.
Figure 9:
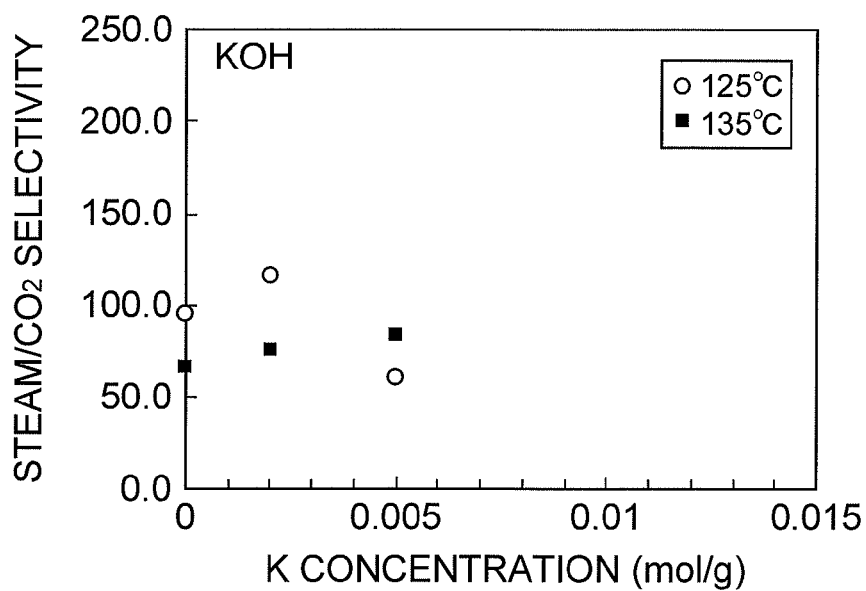
Figure 10:
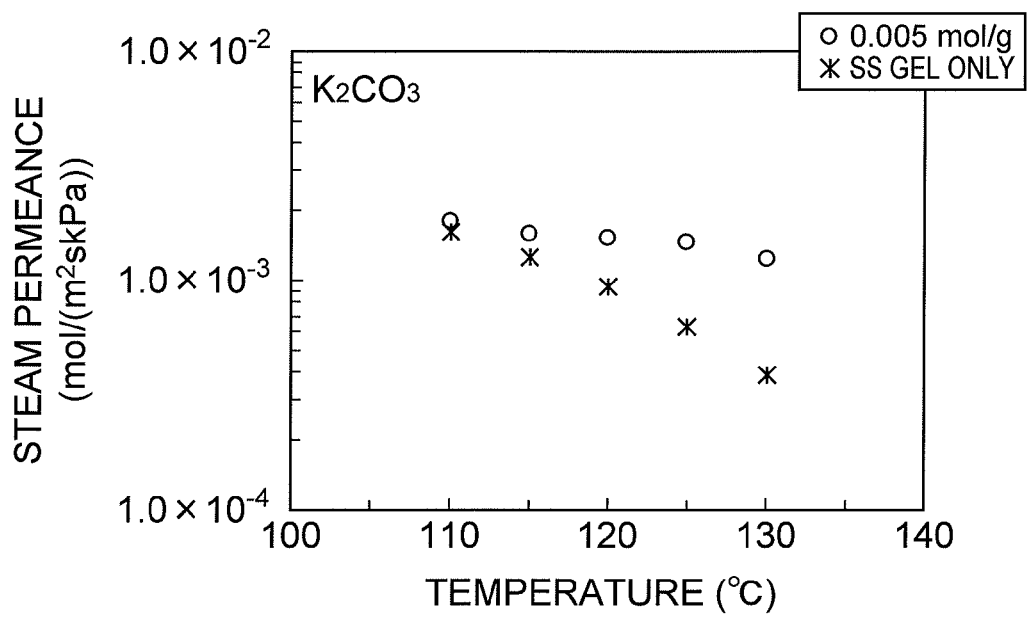
FIG. 10 is a graph showing the relation between the steam permeance and temperature, and the relation between the steam/$CO_2$ selectivity and the K concentration.
Figure 10:
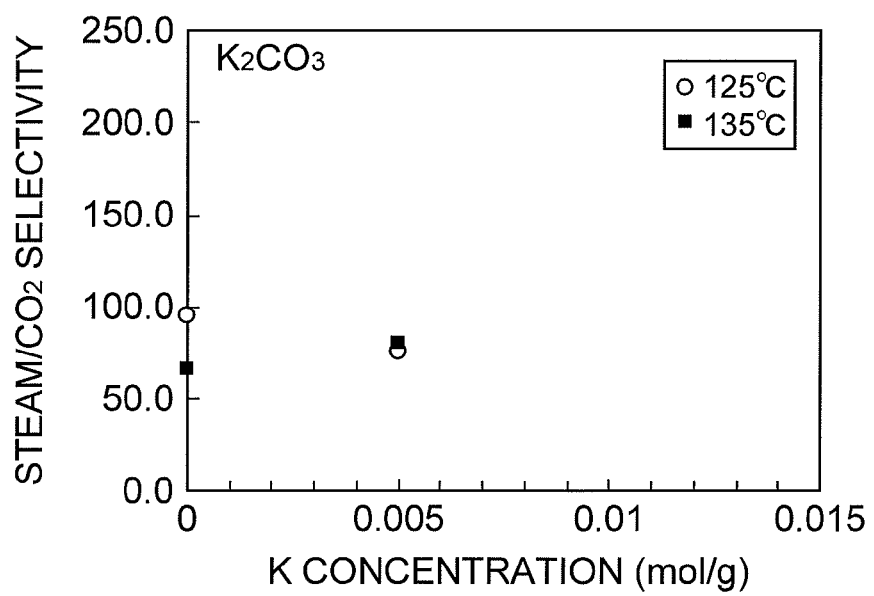
Figure 11:
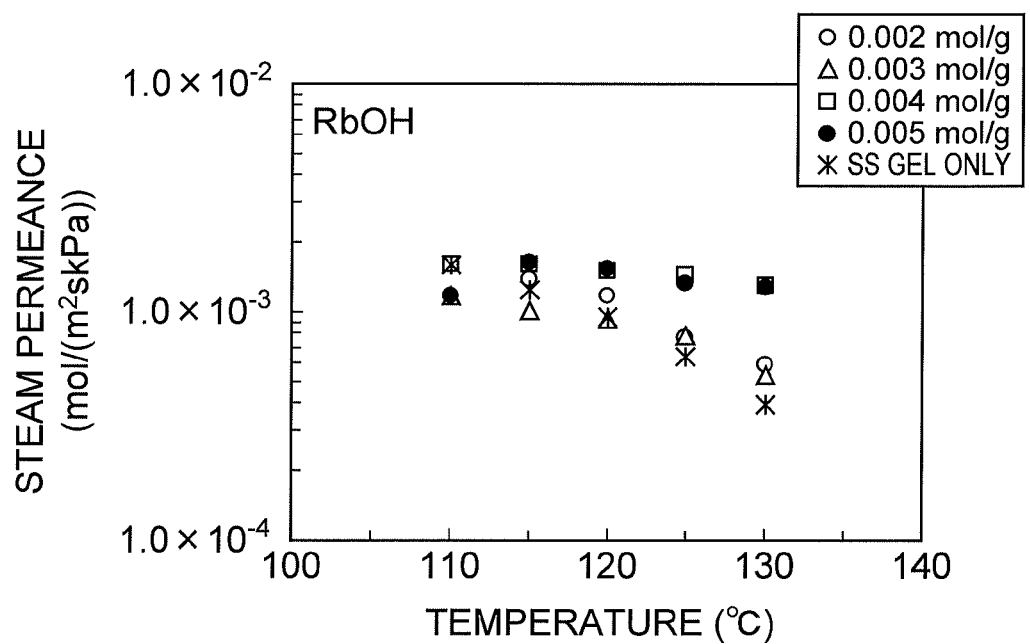
FIG. 11 is a graph showing the relation between the steam permeance and temperature, and the relation between the steam/$CO_2$ selectivity and the Rb concentration.
Figure 11:
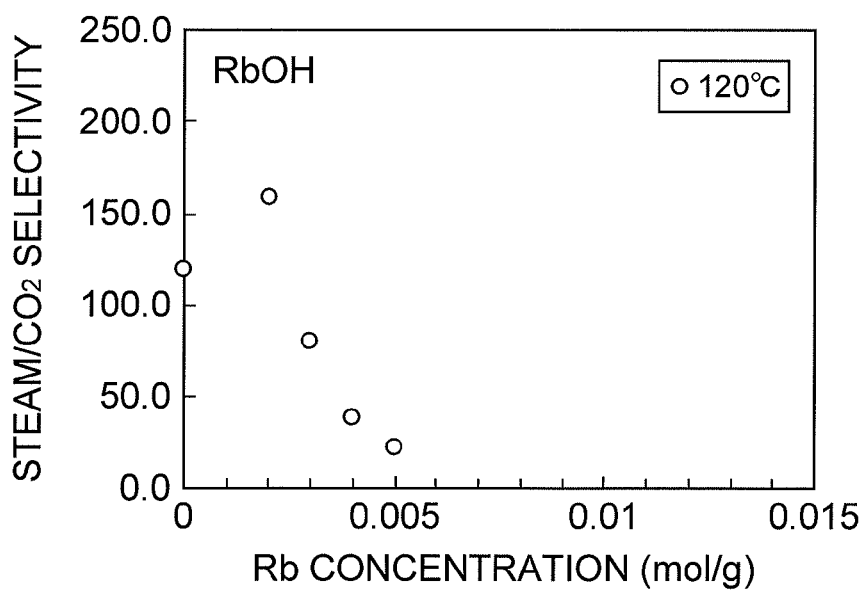
Figure 12:
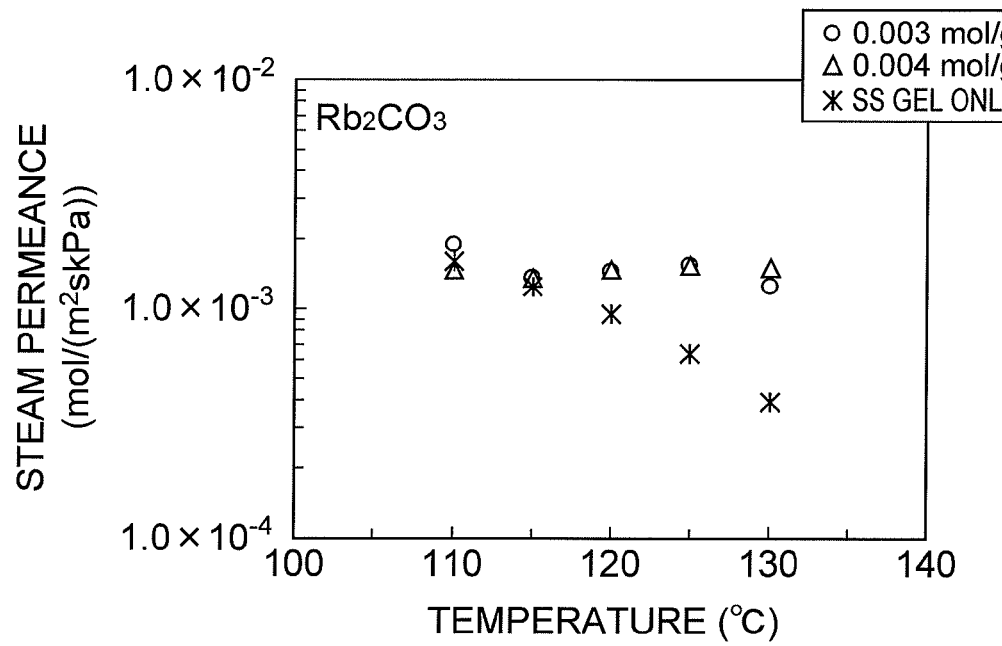
FIG. 12 is a graph showing the relation between the steam permeance and temperature, and the relation between the steam/$CO_2$ selectivity and the Rb concentration.
Figure 12:
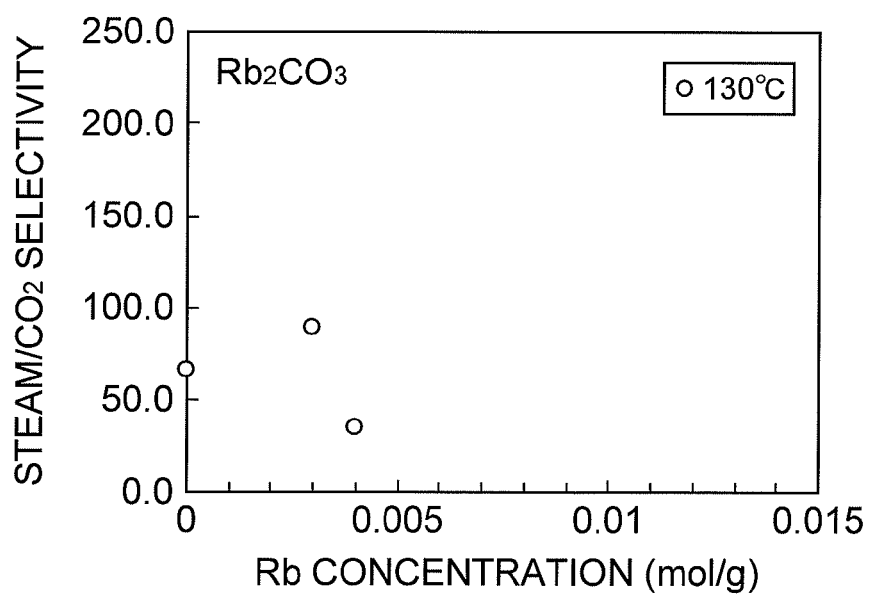

FIG. 3 is a graph showing the relation between the steam permeance and temperature, and the relation between the steam/$CO_2$ selectivity and temperature, in the various membranes of SS gel only, SS gel/CsOH, PVA/CsOH, and PVA only. All of the membranes of SS gel only, SS gel/CsOH, and PVA/CsOH exhibited high steam permeance as compared with the membrane for comparison formed of PVA only. All of the membranes exhibited steam/$CO_2$ selectivity to a certain degree or higher, and it was confirmed that all of the membranes may be used as steam permselective membranes. Among them, the membrane using SS gel exhibited particularly high steam/$CO_2$ selectivity in a high temperature region.

(Study 2)

1. Production of Membrane Laminates Including Steam Permselective Membrane

Membrane laminates each including a steam permselective membrane containing a carrier and the SS gel at the concentrations indicated in the following various tables, were produced by the same procedure as that used in Study 1, by using CsOH, $Cs_2CO_3$, $CsNO_3$, $CH_3COOCs$ or CsCl as the carrier. In the respective tables, the Cs concentration was the proportion of the mole number of Cs relative to the total mass (g) of the SS gel and the carrier (CsOH), and the carrier concentration was the proportion of the mass of the carrier relative to the total mass of the SS gel and the carrier.

TABLE 2

| CsOH | 1 | 2 | 3 | 4 | 5 | Unit |
|---|---|---|---|---|---|---|
| Amount of Aqueous solution of SS gel | 10.25 | 10.25 | 10.25 | 10.25 | 10.25 | g |
| Amount of SS gel | 0.25 | 0.25 | 0.25 | 0.25 | 0.25 | g |
| Amount of carrier | 0.044 | 0.107 | 0.204 | 0.374 | 0.748 | g |
| Cs concentration | 0.001 | 0.002 | 0.003 | 0.004 | 0.005 | mol/g |
| Carrier concenration | 15 | 30 | 45 | 60 | 75 | % by mass |

TABLE 3

| $Cs_2CO_3$ | 1 | 2 | 3 | 4 | 5 | Unit |
|---|---|---|---|---|---|---|
| Amount of Aqueous solution of SS gel | 10.25 | 10.25 | 10.25 | 10.25 | 10.25 | g |
| Amount of SS gel | 0.25 | 0.25 | 0.25 | 0.25 | 0.25 | g |
| Amount of carrier | 0.049 | 0.121 | 0.239 | 0.468 | 1.098 | g |
| Cs concentration | 0.001 | 0.002 | 0.003 | 0.004 | 0.005 | mol/g |
| Carrier concenration | 16 | 33 | 49 | 65 | 81 | % by mass |

TABLE 4

| $CsNO_3$ | 1 | 2 | 3 | 4 | Unit |
|---|---|---|---|---|---|
| Amount of Aqueous solution of SS gel | 10.25 | 10.25 | 10.25 | 10.25 | g |
| Amount of SS gel | 0.25 | 0.25 | 0.25 | 0.25 | g |
| Amount of carrier | 0.061 | 0.160 | 0.352 | 0.885 | g |
| Cs concentration | 0.001 | 0.002 | 0.003 | 0.004 | mol/g |
| Carrier concenration | 19 | 39 | 58 | 78 | % by mass |

TABLE 5

| $CH_3COOCs$ | 1 | 2 | 3 | Unit |
|---|---|---|---|---|
| Amount of Aqueous solution of SS gel | 10.25 | 10.25 | 10.25 | g |
| Amount of SS gel | 0.25 | 0.25 | 0.25 | g |
| Amount of carrier | 0.059 | 0.156 | 0.339 | g |
| Cs concentration | 0.001 | 0.002 | 0.003 | mol/g |
| Carrier concenration | 19 | 38 | 58 | % by mass |

TABLE 6

| CsCl | 1 | 2 | 3 | 4 | 5 | Unit |
|---|---|---|---|---|---|---|
| Amount of Aqueous solution of SS gel | 10.25 | 10.25 | 10.25 | 10.25 | 10.25 | g |
| Amount of SS gel | 0.25 | 0.25 | 0.25 | 0.25 | 0.25 | g |
| Amount of carrier | 0.051 | 0.127 | 0.255 | 0.516 | 1.330 | g |
| Cs concentration | 0.001 | 0.002 | 0.003 | 0.004 | 0.005 | mol/g |
| Carrier concenration | 17 | 34 | 51 | 67 | 84 | % by mass |

2. Evaluation of Gas Permeation Performance

The $CO_2$ permeance and the steam/$CO_2$ selectivity of various membranes were evaluated by the same procedure and under the same conditions as those used in Study 1. FIGS. 4, 5, 6, 7 and 8 are graphs respectively showing the relation between the steam permeance and temperature and the relation between the steam/$CO_2$ selectivity and the Cs concentration for the membranes that used CsOH, $Cs_2CO_3$, $CsNO_3$, $CH_3COOCs$ and CsCl as carriers. Since all of the membranes exhibited high steam permeance and high steam/$CO_2$ selectivity, it was confirmed that the various Cs compounds were useful as carriers for enhancing the permeation performance. When the Cs concentration increases to a certain degree, a tendency that the steam/$CO_2$ selectivity decreases was recognized, but selectivity was maintained to the extent that steam could be selectively permeated.

(Study 3)

1. Production of Membrane Laminates Including Steam Permselective Membrane

Membrane laminates each including a steam permselective membrane containing a carrier and the SS gel at the concentrations indicated in the following various tables, were produced by the same procedure as that used in Study 1, by using KOH, $K_2CO_3$, RbOH or $Rb_2CO_3$ as the carrier. In Tables 7 to 10, the amount of carrier means the amount of KOH, $K_2CO_3$, RbOH or $Rb_2CO_3$; the K concentration or the like means the proportion of the mole number of K or the like relative to the total mass (g) of the SS gel and the carrier (KOH or the like); and the carrier concentration means the proportion of the mass of the carrier relative to the total mass of the SS gel and the carrier (KOH or the like).

TABLE 7

| KOH | 1 | 2 | Unit |
|---|---|---|---|
| Amount of Aqueous solution of SS gel | 10.25 | 10.25 | g |
| Amount of SS gel | 0.25 | 0.25 | g |
| Amount of carrier | 0.032 | 0.097 | g |
| K concentration | 0.002 | 0.005 | mol/g |
| Carrier concentration | 11 | 28 | % by mass |

TABLE 8

| $K_2CO_3$ | 1 | Unit |
|---|---|---|
| Amount of Aqueous solution of SS gel | 10.25 | g |
| Amount of SS gel | 0.25 | g |
| Amount of carrier | 0.132 | g |
| K concentration | 0.005 | mol/g |
| Carrier concenration | 35 | % by mass |

TABLE 9

| RbOH | 1 | 2 | 3 | 4 | Unit |
|---|---|---|---|---|---|
| Amount of Aqueous solution of SS gel | 10.25 | 10.25 | 10.25 | 10.25 | g |
| Amount of SS gel | 0.25 | 0.25 | 0.25 | 0.25 | g |
| Amount of carrier | 0.064 | 0.111 | 0.174 | 0.263 | g |
| Rb concentration | 0.002 | 0.003 | 0.004 | 0.005 | mol/g |
| Carrier concenration | 21 | 31 | 41 | 51 | % by mass |

TABLE 10

| $Rb_2CO_3$ | 1 | 2 | Unit |
|---|---|---|---|
| Amount of Aqueous solution of SS gel | 10.25 | 10.25 | g |
| Amount of SS gel | 0.25 | 0.25 | g |
| Amount of carrier | 0.133 | 0.215 | g |
| Rb concentration | 0.003 | 0.004 | mol/g |
| Carrier concenration | 35 | 46 | % by mass |

2. Evaluation of Gas Permeation Performance

The $CO_2$ permeance and the steam/$CO_2$ selectivity of various membranes were evaluated by the same procedure and under the same conditions as those used in Study 1. FIGS. 9, 10, 11, and 12 are graphs respectively showing the relation between the steam permeance and temperature and the relation between the steam/$CO_2$ selectivity and the Cs concentration for the membranes that used KOH, $K_2CO_3$, RbOH and $Rb_2CO_3$ as carriers. All of the membranes exhibited high steam permeance and high steam/$CO_2$ selectivity. From the results shown in FIGS. 9 to 12, it was confirmed that by using K compounds or Rb compounds, the steam permeance in a high temperature region was further enhanced as compared with the membrane formed of the SS gel only. When the concentration of Rb or the like increases to a certain degree, a tendency that the steam/$CO_2$ selectivity decreases was recognized, but selectivity was maintained to the extent that steam could be selectively permeated.

(Study 4)

For the membrane formed from the SS gel only as produced by the same procedure as that used in Study 1, an evaluation of the gas permeation performance was carried out under the conditions indicated in the following table, without using a sweep gas.

TABLE 11

|  |  | Reference value | Unit |
|---|---|---|---|
| Temperature |  | 130 | ° C. |
| Pressure | Feed | 140, 160, 180, 200 | kPa |
|  | Sweep | 100 | kPa |
| Gas flow rate(dry base) |  |  |  |
| Feed | $CO_2$ | 152 | mL/min |
|  | $N_2$ | 8 | mL/min |
| Sweep | Ar | None | mL/min |
| Amount of $H_2O$ supply | Feed* | 0.54 | mL/min |
|  | Sweep | — | mL/min |

Figure 13:
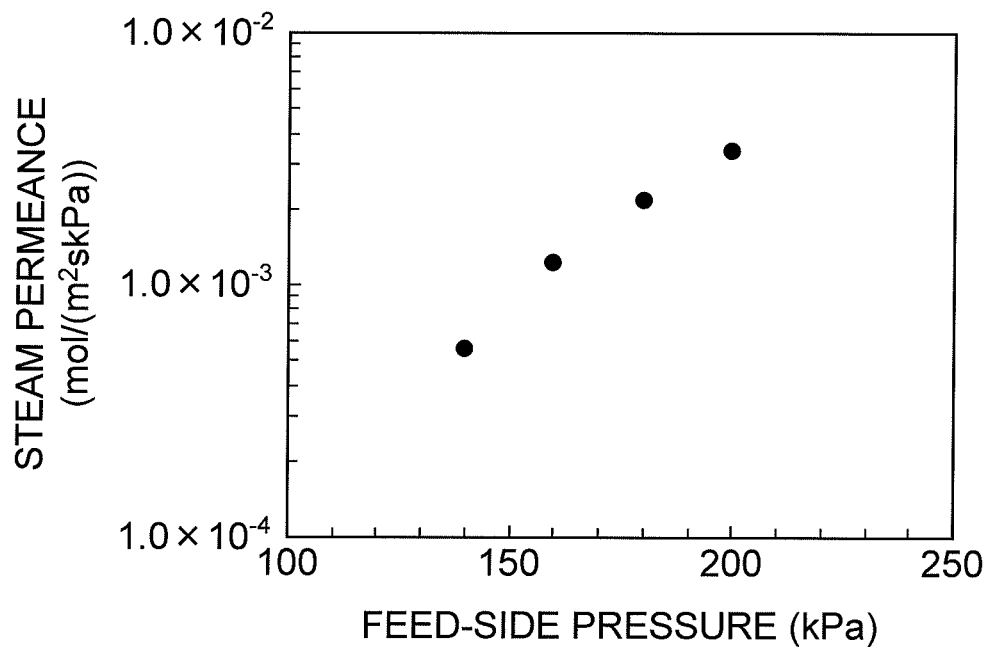
FIG. 13 is a graph showing the relation between the steam permeance and the feed-side pressure, and the relation between the steam/$CO_2$ selectivity and the feed-side pressure.
Figure 13:
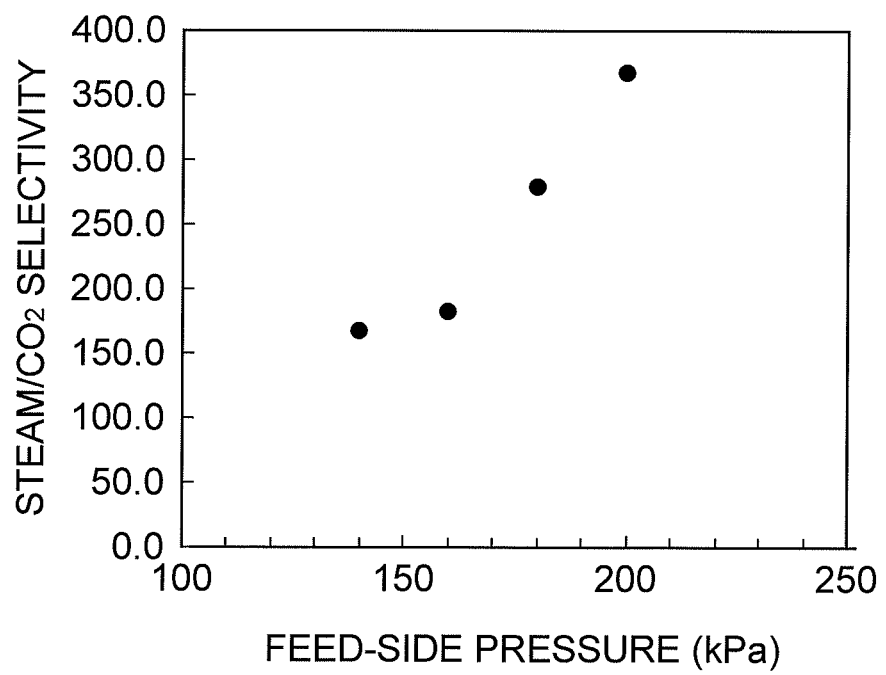

FIG. 13 is a graph showing the relation between the steam permeance and the feed-side pressure, and the relation between the steam/$CO_2$ selectivity and the feed-side pressure. As shown in FIG. 13, it was confirmed that even though a sweep gas was not used, high steam permeance and high steam/$CO_2$ selectivity were obtained by providing a difference in the partial pressure of steam between the feed side and the sweep side.

(Study 5)

An apparatus having the same configuration as that of the gas treating apparatus shown in FIG. 2 was prepared. A cylindrical-shaped ceramic porous membrane (alumina porous membrane) was used as the porous membrane 4, and a hydrophilic polymer layer 3 containing the SS gel and CsCl as a carrier was supported on the outer peripheral surface of the porous membrane. The carrier concentration was 15% by mass. An evaluation of the gas permeation performance was carried out by using the prepared apparatus under the conditions indicated in the following table. The $CO_2$ flow rate and Ar flow rate in the table are expressed as volume flow rates at 25° C. and 1 atm. The amount of $H_2O$ supply is expressed as the amount of supply of liquid $H_2O$. Liquid $H_2O$ was vaporized by heating, and a mixed gas of vaporized $H_2O$ and $CO_2$ was supplied to the feed side. The steam fraction of the mixed gas was 82%. The pressures indicated in the table are absolute pressures.

TABLE 12

|  |  | Reference value | Unit |
|---|---|---|---|
| Temperature |  | 130 | ° C. |
| Pressure | Feed | 300 | kPa |
|  | Sweep | 100 | kPa |
| Gas flow rate(dry base) |  |  |  |
| Feed | $CO_2$ | 160 | mL/min |
|  | $N_2$ | — | mL/min |
| Sweep | Ar | None | mL/min |
| Amount of $H_2O$ supply | Feed | 0.54 | mL/min |
|  | Sweep | — | mL/min |

As a result of the evaluation of the gas permeation performance, the steam permeance was $3.1 \times 10^{-3}$ [mol/($m^2 \cdot s \cdot kPa$)], and the steam/$CO_2$ selectivity was $2.9 \times 10^3$. From these results, it was confirmed that a cylindrical-shaped steam permselective membrane also had excellent steam permeability and steam/$CO_2$ selectivity.

INDUSTRIAL APPLICABILITY

The steam permselective membrane according to the present invention may be used in order to selectively separate steam from a mixed gas containing steam.

REFERENCE SIGNS LIST

1 STEAM PERMSELECTIVE MEMBRANE
2a, 2b POROUS MEMBRANES
3 HYDROPHILIC POLYMER
4 POROUS MEMBRANE OF LAYERED STEAM PERMSELECTIVE MEMBRANE
10 MEMBRANE LAMINATE
20 GAS TREATING APPARATUS
30 MIXED GAS CONTAINING STEAM

The invention claimed is:

1. A steam permselective membrane comprising:
a porous membrane, and
a hydrophilic polymer layer comprising
    a hydrophilic polymer; and
    an alkali metal compound that is a hydroxide, a nitrate, or a chloride of an alkali metal selected from cesium, potassium and rubidium,
wherein at least a portion of the hydrophilic polymer layer is filled into the porous membrane, and
(i) when the hydrophilic polymer comprises the hydroxide, the nitrate, or the chloride of cesium, the concentration of cesium based on the total mass of the hydrophilic polymer and the alkali metal compound is 0.003 mol/g or less; and/or (ii) when the hydrophilic polymer comprises (a) the hydroxide, the nitrate, or the chloride of potassium, and/or (b) the hydroxide, the nitrate, or the chloride of rubidium, the total concentration of potassium and rubidium based on the total mass of the hydrophilic polymer and the alkali metal compound is 0.005 mol/g or less.

2. The steam permselective membrane according to claim 1, wherein said hydrophilic polymer is a crosslinked hydrophilic polymer comprising a polyvinyl alcohol-polyacrylic acid salt copolymer.

3. The steam permselective membrane according to claim 1, wherein the alkali metal compound is the hydroxide, the nitrate, or the chloride of cesium, and the concentration of cesium based on the total mass of the hydrophilic polymer and the alkali metal compound is 0.003 mol/g or less.

4. The steam permselective membrane according to claim 1, wherein
the hydrophilic polymer comprises (a) the hydroxide, the nitrate, or the chloride of potassium, and/or (b) the hydroxide, the nitrate, or the chloride of rubidium, and
the total concentration of potassium and rubidium based on the total mass of the hydrophilic polymer and the alkali metal compound is 0.005 mol/g or less.

5. A method of separating steam from a mixed gas, the method comprising separating the steam from the mixed gas by causing the steam in the mixed gas containing steam to permeate through the steam permselective membrane of claim 1.

6. The method according to claim 5, wherein the steam is caused to permeate through the steam permselective membrane by supplying the mixed gas containing steam to one surface side of the steam permselective membrane, and reducing the partial pressure of steam on the other surface side of the steam permselective membrane to less than the partial pressure of steam in the mixed gas.

7. The method according to claim 6, wherein the partial pressure of steam on the other surface side of the steam permselective membrane is reduced to less than the partial pressure of steam in the mixed gas, without substantially using a sweep gas.

8. The method according to claim 5, wherein the mixed gas includes $CO_2$ gas.

9. A method of separating steam from a mixed gas, the method comprising separating the steam from the mixed gas by causing the steam in the mixed gas containing steam and $CO_2$ to permeate through a steam permselective membrane comprising a crosslinked hydrophilic polymer selected from the group consisting of polyacrylic acid homopolymer, chitosan, polyvinylamine, and polyallylamine.

10. The steam permselective membrane according to claim 2, wherein the crosslinked hydrophillic polymer is crosslinked to form a three-dimensional network structure.

11. The steam permselective membrane according to claim 1, wherein the alkali metal compound is the hydroxide of an alkali metal selected from cesium, potassium and rubidium.

12. The steam permselective membrane according to claim 1, wherein the alkali metal compound is the nitrate of an alkali metal selected from cesium, potassium and rubidium.

13. The steam permselective membrane according to claim 1, wherein the alkali metal compound is the chloride of an alkali metal selected from cesium, potassium and rubidium.

14. The steam permselective membrane according to claim 1, wherein the alkali metal compound comprises the hydroxide, the nitrate, or the chloride of potassium.

15. The steam permselective membrane according to claim 1, wherein the hydrophilic polymer is a gel-like polymer.

* * * * *